(12) United States Patent
Stein

(10) Patent No.: US 7,625,162 B2
(45) Date of Patent: Dec. 1, 2009

(54) MACHINE TOOL COMPRISING AN ADJUSTABLE CLAMPING TABLE FOR WORKPIECES

(75) Inventor: Peter Stein, Bretthausen (DE)

(73) Assignee: OPS-Ingersoll Funkenerosion GmbH, Burbach (DE)

( * ) Notice: Subject to any disclaimer, the term of this patent is extended or adjusted under 35 U.S.C. 154(b) by 664 days.

(21) Appl. No.: 10/589,645

(22) PCT Filed: Feb. 28, 2005

(86) PCT No.: PCT/EP2005/002089

§ 371 (c)(1),
(2), (4) Date: Aug. 15, 2006

(87) PCT Pub. No.: WO2005/084881

PCT Pub. Date: Sep. 15, 2005

(65) Prior Publication Data

US 2007/0196192 A1 Aug. 23, 2007

(30) Foreign Application Priority Data

Mar. 3, 2004 (DE) .................. 10 2004 010 984

(51) Int. Cl.
*B23C 1/14* (2006.01)
(52) U.S. Cl. ............... 409/168; 269/71; 408/89; 408/234; 409/189; 409/219; 409/221; 409/235
(58) Field of Classification Search .......... 408/87, 408/88, 89, 90, 234; 409/163, 165, 168, 409/189, 197, 198, 219, 221, 224, 225, 235; 29/26 A; 269/71, 57, 9, 289 R; 82/171
See application file for complete search history.

(56) References Cited

U.S. PATENT DOCUMENTS

| | | | | |
|---|---|---|---|---|
| 3,998,127 A | * | 12/1976 | Romeu | 409/225 |
| 5,117,552 A | * | 6/1992 | Babel | 483/36 |
| 5,429,345 A | | 7/1995 | Yang | 269/71 |
| 5,611,137 A | * | 3/1997 | Braun | 29/560 |
| 5,634,250 A | * | 6/1997 | Mihailovic | 29/26 A |
| 5,678,291 A | * | 10/1997 | Braun | 29/26 A |
| 2003/0129035 A1 | | 7/2003 | Schworer | 409/168 |

FOREIGN PATENT DOCUMENTS

| | | | |
|---|---|---|---|
| CA | 2283332 | | 3/1997 |
| DE | 4338596 A1 | * | 5/1994 |
| DE | 94 22 019 | | 9/1997 |
| DE | 10259215 A1 | * | 7/2004 |
| JP | 02100842 A | * | 4/1990 |
| JP | 02279249 A | * | 11/1990 |
| JP | 10128608 A | * | 5/1998 |

* cited by examiner

*Primary Examiner*—Daniel W Howell
(74) *Attorney, Agent, or Firm*—Andrew Wilford

(57) ABSTRACT

The invention relates to a machining apparatus (1) having a frame (2) for the machining of a workpiece (3) that has a tool holder (4) that is mounted such that it can be shifted in a straight line in three axial directions (x, y, z) relative to a workpiece support (5) that is mounted beneath the tool holder (4), the workpiece support (5) being designed such that it can swivel the workpiece (3) about at least one axis (A, B). For improving the applicability of the machining apparatus, this machining apparatus according to the invention is characterized by a workpiece-holding table (6) that is designed such that it bridges the workpiece support (5) and can thus be firmly attached to the frame (2).

8 Claims, 3 Drawing Sheets

MACHINE TOOL COMPRISING AN ADJUSTABLE CLAMPING TABLE FOR WORKPIECES

CROSS REFERENCE TO RELATED APPLICATIONS

Figure 1:
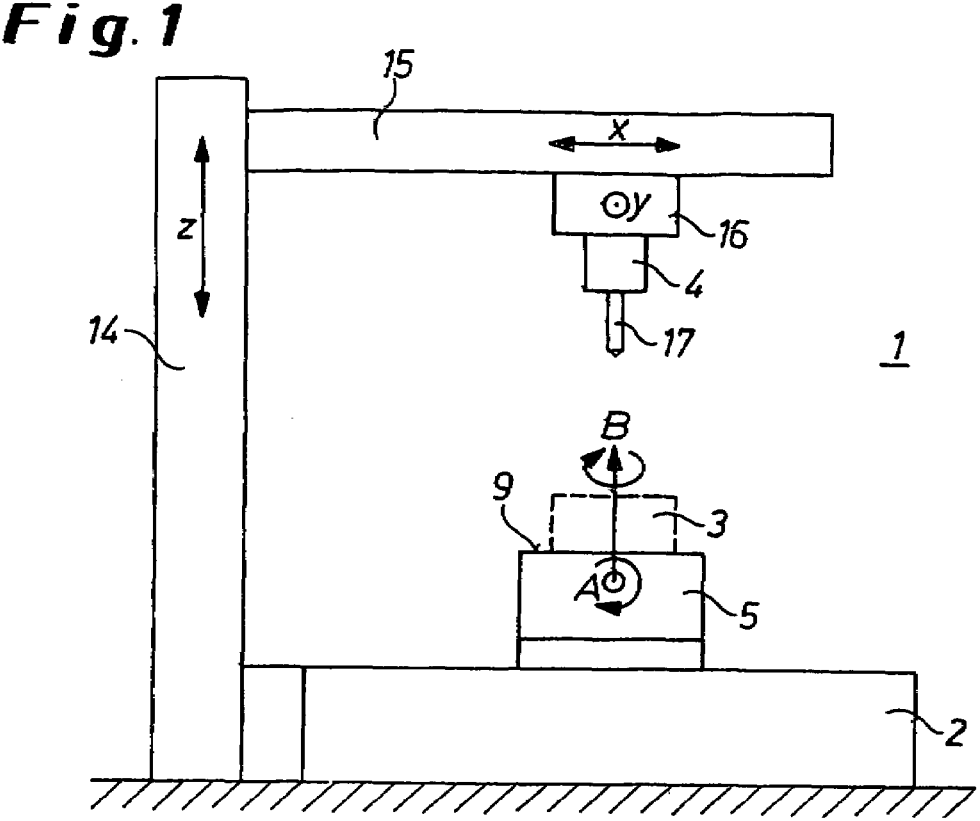

This application is the U.S. national phase of PCT application PCT/EP2005/002089, filed 28 Feb. 2005, published 15 Sep. 2005 as WO 2005/084881, and claiming the priority of German patent application 102004010984.2 itself filed 3 Mar. 2004.

The invention relates to a machining apparatus for the machining of a workpiece and having a frame and a tool holder that is mounted such that it can be shifted in a straight line in three axial directions relative to a workpiece support that is mounted under the tool holder, the workpiece support being designed such that it can swivel the workpiece about at least one axis.

Machining apparatuses of this category are largely known in the state of the art, in particular designed as milling machines. The machines in most cases have three translation axes for machining, i.e., a chip-removing tool, e.g. a milling tool, can be shifted in a straight line along three spatial axes general perpendicular to one another and can thus be positioned at any place relative to a workpiece.

The improvement of the controls as well as of the programming systems for these machining apparatuses have entailed the fact that often in addition to the three (straight-line) translation axes, further swivel axes are provided in the machining apparatus. By means of the swivel axes, it is possible to swivel the workpiece relative to the tool such that by clamping the workpiece once, up to five sides of the workpiece can be machined. Thus, it is also possible to machine complex geometric structures more economically than by means of machines having only three translation axes.

Concerning the possibility of providing two swivel axes in addition to the three translation axes, in principle two different approaches are possible.

According to a first approach, the tool is mounted such that it can be swivelled in addition to its translation movement. In this case, the tool holder has a swivel head so that the tool can be moved accordingly.

As an alternative thereto, it is also possible to design the workpiece support such that it can be swivelled. In this case, the workpiece is mounted on a swivel table by means of which it can be brought into a desired swivelled position.

In the case of the tool designed such that it can be swivelled, the dimension and the mass of the workpiece that then can be supported as resting on the frame is advantageously not important. However this entails the disadvantage that the swivelling behavior of the tool is negatively influenced, since the mass increases adjacent the tool. Furthermore, due to the swivel head that is required adjacent the tool, the traveling area of the machining tool is limited or reduced. Therefore, this approach is typically used in the case of the dimensions of the workpiece or the weight of the workpiece no longer admitting swivelling of the workpiece.

In the case where the workpiece is swivelled, there are again two possible approaches:

According to a first possibility, a table that is mounted such that it can be swivelled relative to the frame has the function of providing a possibility of clamping the workpiece, i.e., the workpiece is positioned on the swivel table.

An alternative approach provides a common machine table on which a swivel table is mounted.

The last-mentioned approach however is a compromise solution: The swivelling of the workpiece about at least one swivel axis is not effected in the center of gravity in this case, so the traveling area of the machining tool and the possibility of bearing a load on the swivel table are limited.

Indeed these disadvantages can be avoided in the case of a swivel table that is embedded in the frame; in this case, the machining apparatus is no longer able to machine workpieces that do not fit onto the embedded swivel table due to their dimensions or their weight.

In the prior art, multiple detail solutions are known that however relate to a specific problem.

For example, EP 1 262 275 A1 discloses a workpiece holder for a machining machine that has a swivel bridge that is supported such that it can be swivelled between two bearing walls. The bearing walls limit a working area laterally. A drive motor serves for swivelling the swivel bridge and is mounted outside the working area on an outer face of the bearing walls. A sprocket serves for swivelling and is mounted adjacent the inner faces of the bearing walls. The bearing points or the bearing studs of the swivel bridge for this reason do not have to transmit driving torque and are not subject to torsional stress.

From EP 0 964 771 B1, a workpiece-holding table for receiving workpieces to be machined is known that can be rotated, swivelled and adjusted and thus possesses appropriate clearances. Here, there is a magnetic support ring as support housing for receiving a clamping device having a device for adjusting angles and for positioning.

Finally, a drive device is described in EP 0 666 132 B1 that is formed by multiaxis overlaying double-angle displacement of two overlaying structures. The drive device has a first driven disk as well as a second driven disk for supporting a workpiece as well as a device for mounting the second disk on the first disk such that the second disk is pivotable. Thus, an eccentric driving device is provided.

Regarding the discussed advantages and disadvantages of the structures of machining apparatuses having swivel heads or swivel tables, the invention is based on the object of designing a machining apparatus such that the described disadvantages can be avoided and the fabrication system can be used in an optimal manner and the machining apparatus can be improved in terms of its applicability.

The solution provided for attaining this object is characterized by a workpiece-holding table that is designed such that it bridges the workpiece support and can thus be firmly attached to the frame.

A first advanced design provides that the workpiece support is designed such that it can displace the workpiece along two axes perpendicular to each other, one axis being a swivel axis and the other axis being a rotational axis. The workpiece-holding table can be attached to the frame by means of a screw connection.

A particular appropriate handling of the workpiece-holding table is provided if this table has two projecting arms on its extremities by means of which it can be attached to the frame.

The workpiece-holding table can further have a number of fixing elements, in particular T-slots on the side facing the tool holder when mounted in the machining apparatus.

Advantageously, the workpiece-clamping table has in at least one section along a principal axis direction of the machining apparatus, advantageously in two sections of two principal axis directions of the machining apparatus that are mounted perpendicular to each other, a substantially U-shaped contour.

Preferably, the tool-holding table is of cast structure.

Finally, the approach of the invention is in particular appropriate in the case of milling machines.

The approach according to the invention thus provides a machining apparatus, in particular a milling machine, in which a swivel table for swivelling the workpiece can be embedded into the frame such that a fixed workpiece-holding table that can be subsequently inserted if necessary, can be mounted on it.

The advantage resulting therefrom consists in the possibility of using the machining apparatus on the one hand as a three-axis machine with inserted workpiece-holding table in the case of large workpieces, on the other hand without a workpiece-holding table in the case of small workpieces, where due to the possibility of swivelling of the workpiece support a five-axis fabrication is possible.

Figure 2:
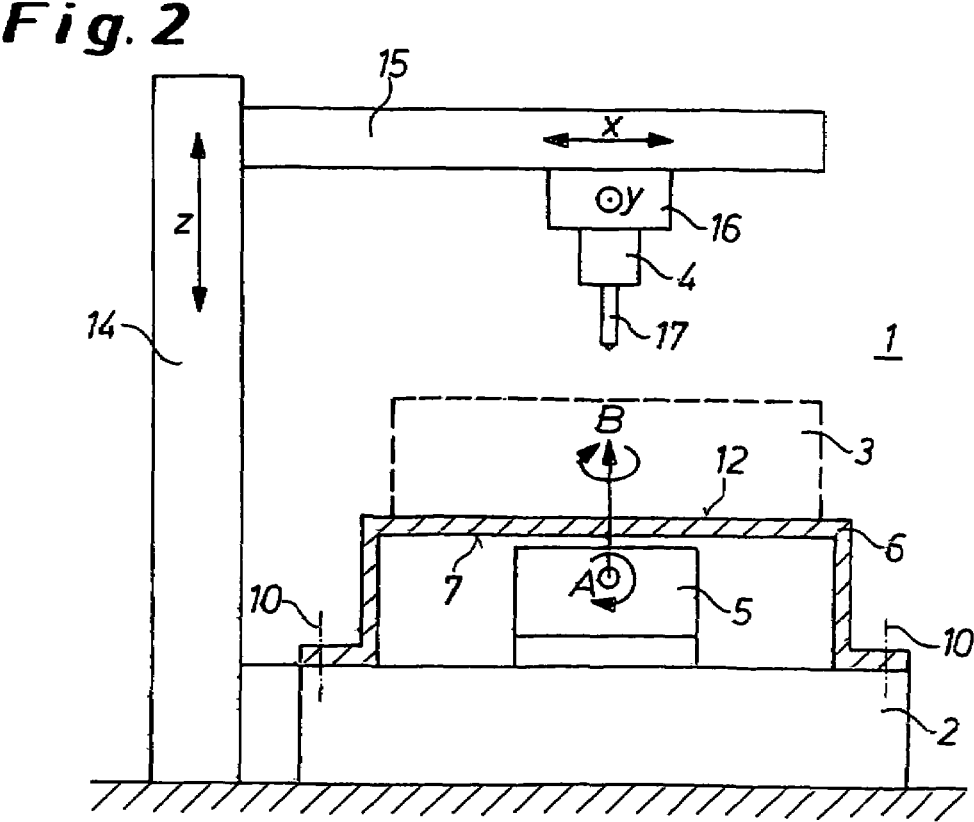
Figure 3:
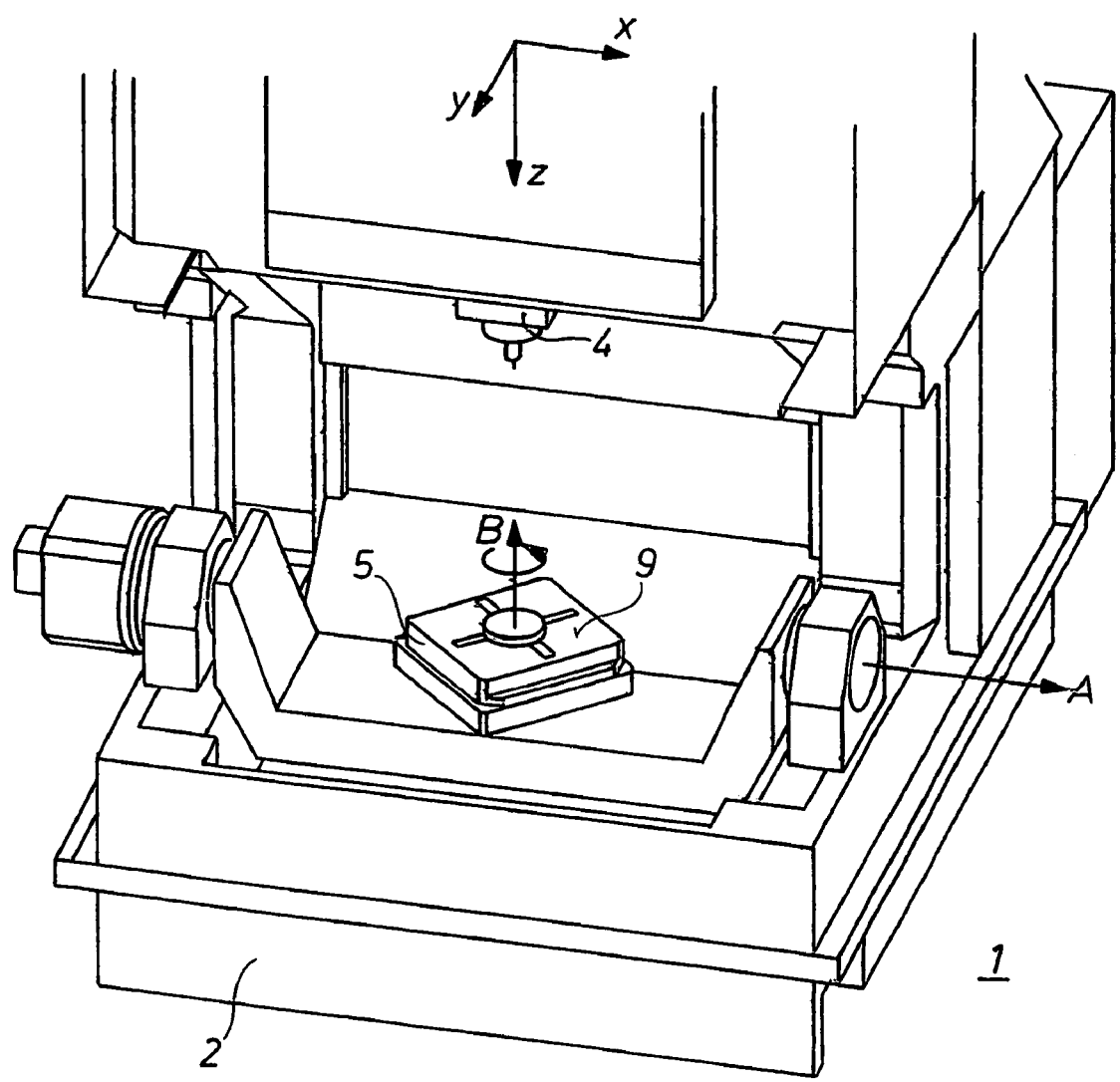
Figure 4:
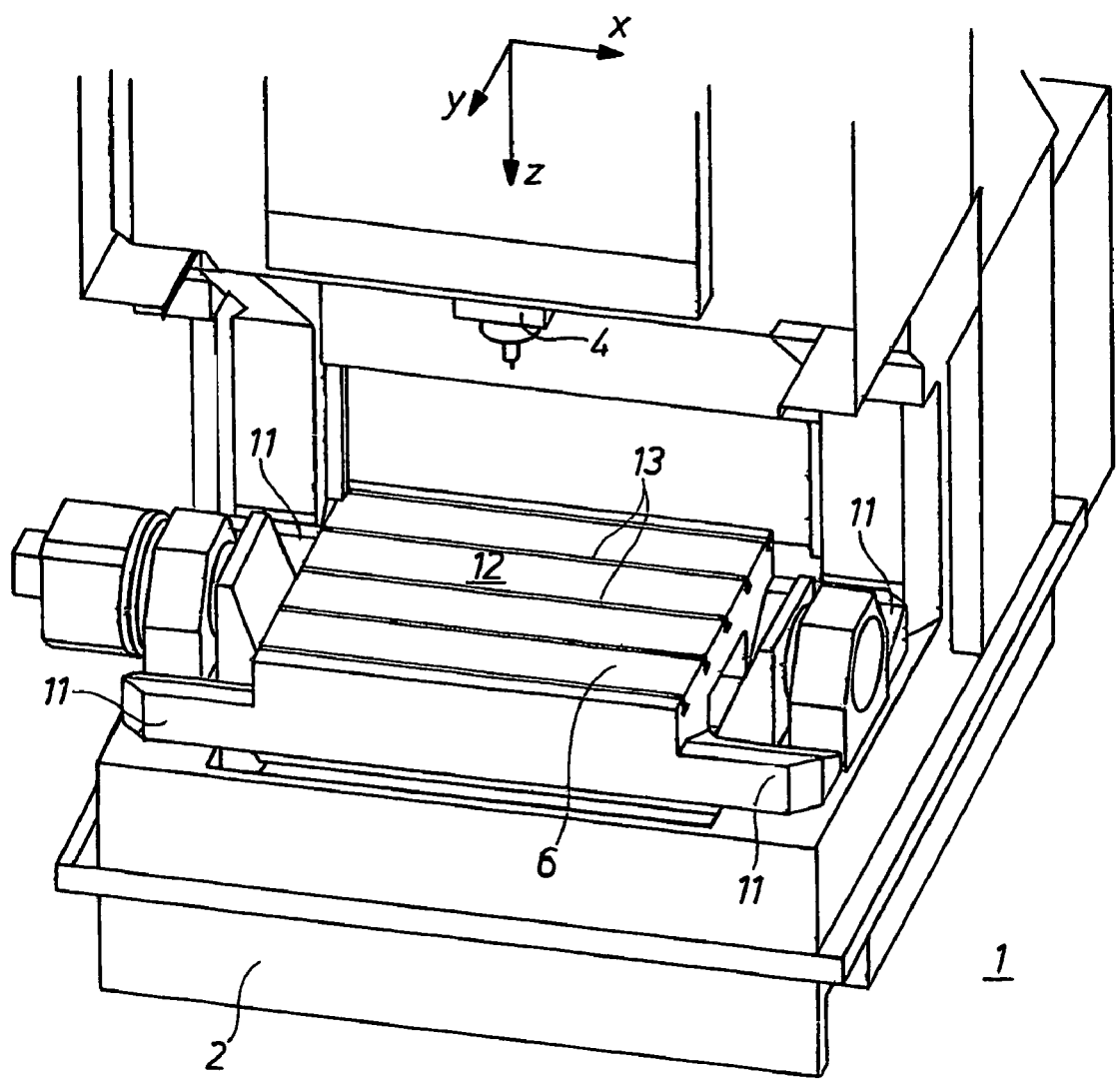

In the drawing, an embodiment of the invention is represented. Therein:

FIG. 1 schematically shows a front view of a milling machine for machining a small workpiece;

FIG. 2 shows a view that is analogous to FIG. 1 with inserted workpiece-holding table for machining a large workpiece, FIG. 3 shows in three-dimensional view a milling machine that is set up for machining a small workpiece; and FIG. 4 shows the view according to FIG. 3, where a workpiece-holding table is installed for machining large workpieces.

In FIG. 1, a milling machine is schematically represented that has a frame 2 that is firmly attached to the ground. A guide post 14 that extends vertically carries a crossbar 15 on which in turn a further crossbar 16 is positioned. The crossbar 16 has a tool holder 4 that supports a milling cutter 17.

By means of unillustrated drive elements, the tool holder 4 and thus the milling cutter 17 can be moved in three axial directions x, y and z, such that the milling cutter can be moved to any spatial position.

A workpiece 3 that is represented by dashed lines is attached to a workpiece support 5 precisely on a top face 9 thereof. The workpiece support 5 can be positioned or shifted along two axes A and B that are perpendicular to each other such that up to five sides of the workpiece 3 can be turned so that they face the milling cutter 17; apart from the surface of the workpiece 3 that is attached to the top face 9 of the workpiece support 5, the workpiece 3 can be machined from all sides by the milling cutter 17.

The arrangement shown in FIG. 1 is perfectly appropriate for machining smaller workpieces 3. On the one hand, the milling cutter 17 or the tool holder 4 is mounted on the guiding rail 14 or on the crossbars 15 or 16 with relatively low vibration due to the low mass of these elements. On the other hand, the tool can be brought into its optimal swivelled position for machining the workpiece on the desired surface.

However, the system shown in FIG. 1 is not appropriate in the case of the workpiece 3 being large and heavy. In this case, the workpiece support 5 does not provide a sufficient support for the workpiece 3.

The machining apparatus 1 is converted for the machining of a large and/or heavy workpiece 3, in this case as seen in FIG. 2.

A workpiece-holding table 6 is mounted on the frame 2 and bridges over the workpiece support 5. This way, the workpiece 3 that is again represented by dashed lines is mounted on the face 12 of the workpiece-holding table 6 that is directed at the tool holder 4 or the milling cutter 17. The workpiece 6 is fixed on the frame 2 by screws 10 that are only shown schematically.

In section along the principal axial direction x as well as in section along the principal axial direction y perpendicular thereto, the workpiece-holding table 6 is designed in cross-section as U-shaped. It thus represents a cap-like structure that is rigid by itself and that is placed on the frame 2.

In the FIGS. 3 and 4, a situation analogous to the FIG. 1 and 2 can be seen, here however a slightly different structural design is provided.

The workpiece support 5 here is designed as well such that it can be swivelled and pivoted about two axes, that is about the axis A that extends horizontally and the rotational axis B that extends vertically. By means of this structure as well, a workpiece 3 that is placed on the upper face of the workpiece support 5 can be machined on almost all sides.

As can be seen from FIG. 4, for the machining of large workpieces, the workpiece-holding table 6 is placed on the frame 2 and attached thereto. The workpiece support 5 therein is bridged by the workpiece-holding table 6 as well. For fixing the workpiece-holding table 6 on the frame 2, in particular four arms 11 that project laterally are provided. The workpiece 3 (not represented) is attached to the upper face of the workpiece-holding table 6, to which end T-slots 13 are used.

LIST OF REFERENCE NUMBERS 1 machining apparatus
2 frame
3 workpiece
4 tool holder
5 workpiece support
6 workpiece-holding table
7 bottom side
8
9 top face
10 screw connection
11 projecting arm
12 face
13 fixing element (T-slot)
14 guiding rail
15 crossbar
16 crossbar
17 milling cutter
x translation principal axial direction
y translation principal axial direction
z translation principal axial direction
A swivel axis
B rotational axis

The invention claimed is:

1. A machining apparatus (1) having a frame (2) for the machining of a workpiece (3) and having a tool holder (4) that is mounted such that it can be shifted in a straight line in three axial directions (x, y, z) relative to a workpiece support (5) that is mounted beneath the tool holder (4), the workpiece support (5) being designed such that it can swivel the workpiece (3) about at least one axis (A, B), characterized by a workpiece-holding table (6) being designed such that it bridges the workpiece support (5) and can thus be firmly attached to the frame (2).

2. The machining apparatus according to claim 1, characterized in that the workpiece support (5) is designed such that it can shift the workpiece (3) along two axes (A, B) that are perpendicular to each other, one axis being a swivel axis (A), the other one being a rotational axis (B).

3. The machining apparatus according to claim 1, characterized in that
the workpiece-holding table (6) can be attached to the frame (2) by a screw connection (10).

4. The machining apparatus according to claim 1, characterized in that
the workpiece-holding table (6) has two projecting arms (11) on its lateral extremities by means of which it can be attached to the frame (2).

5. The machining apparatus according to claim 1, characterized in that
the workpiece-holding table (6) has on its side (12) facing the tool holder (4) when mounted in the machining apparatus (1) a plurality of fixing elements (13).

6. The machining apparatus according to claim 1, characterized in that
the workpiece-holding table (6) is designed as a cast structure.

7. The machining apparatus according to claim 1, characterized in that
it is a milling machine.

8. The machining apparatus according to claim 5, wherein the fixing elements are T-slots.

\* \* \* \* \*